United States Patent
Hasselgruber et al.

(10) Patent No.: US 6,786,529 B2
(45) Date of Patent: Sep. 7, 2004

(54) HARDTOP VEHICLE ROOF MOVABLE BETWEEN CLOSED AND OPEN POSITIONS

(75) Inventors: Andreas Hasselgruber, Eberdingen-Nussdorf (DE); Wojciech Wezyk, Sindelfingen (DE); Klaus Laue, Dreieich (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/637,721

(22) Filed: Aug. 8, 2003

(65) Prior Publication Data

US 2004/0032148 A1 Feb. 19, 2004

Related U.S. Application Data

(63) Continuation-in-part of application No. PCT/EP02/12265, filed on Nov. 4, 2002.

(30) Foreign Application Priority Data

Nov. 9, 2001 (DE) .......................................... 101 54 730

(51) Int. Cl.⁷ ................................................. B60J 7/08
(52) U.S. Cl. ................... 296/108; 296/107.17; 296/121
(58) Field of Search ........................... 296/107.17, 121, 296/120.1, 108, 107.16; 292/DIG. 5

(56) References Cited

U.S. PATENT DOCUMENTS

| 3,059,962 | A | | 10/1962 | Harms et al. |
| 5,269,586 | A | | 12/1993 | Hahn et al. |
| 6,033,008 | A | * | 3/2000 | Mattila .................. 296/107.17 |
| 6,053,560 | A | * | 4/2000 | Rothe ......................... 296/108 |
| 6,283,531 | B1 | * | 9/2001 | Tanigawa et al. ........... 296/103 |
| 6,315,349 | B1 | * | 11/2001 | Kinnanen .................... 296/108 |
| 6,585,310 | B1 | * | 7/2003 | Guillez et al. .............. 296/108 |

FOREIGN PATENT DOCUMENTS

| DE | 43 20 603 | | 1/1995 |
| DE | 198 05 477 | | 8/1999 |
| DE | 100 39 853 | | 9/2001 |
| FR | 99 03243 | * | 3/1999 |
| FR | 2 791 007 | | 9/2000 |

* cited by examiner

Primary Examiner—Joseph D. Pape
(74) Attorney, Agent, or Firm—Klaus J. Bach

(57) ABSTRACT

In a vehicle roof which is movable between a closed position, in which the roof covers an interior vehicle space, and an open position and wherein the roof part includes a locking bolt for engagement with an adjacent vehicle part when the roof is in a closed position, the roof part and the adjacent vehicle part each has a guide tube incorporated therein and the locking bolt is movably supported in one of the adjacent guide tubes and, upon closing of the vehicle roof, is insertable into the adjacent guide tube and lockable thereto so that the guide tubes and the locking bolt form a continuous tube structure with a common axis when the vehicle roof is in the closed position.

11 Claims, 4 Drawing Sheets

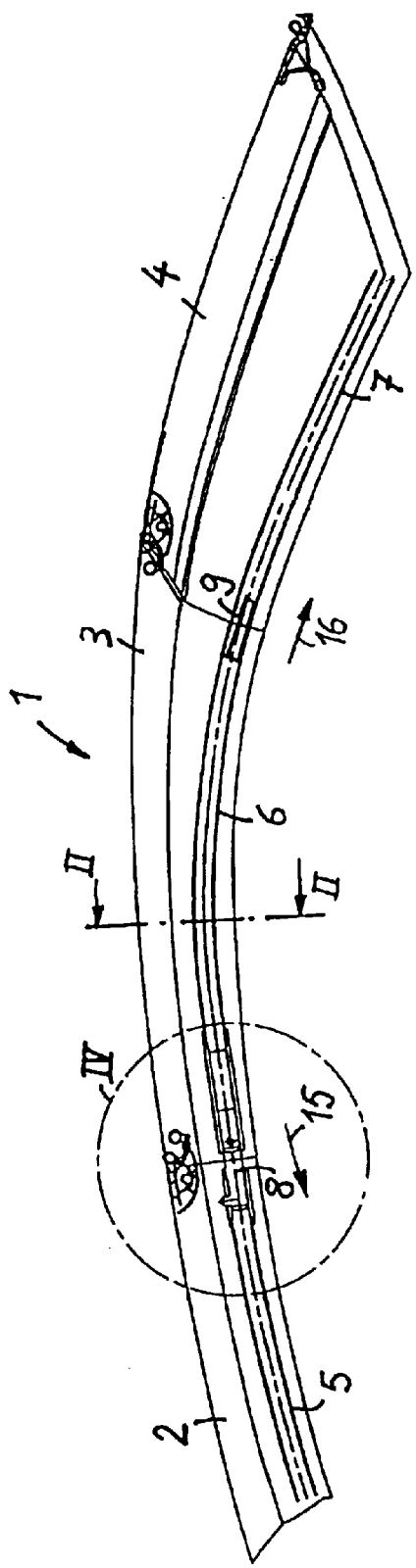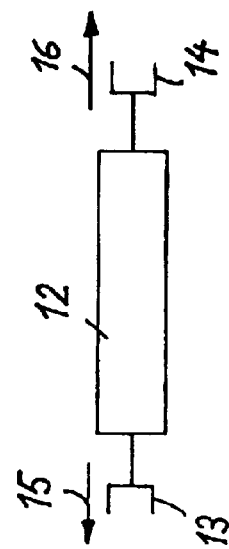

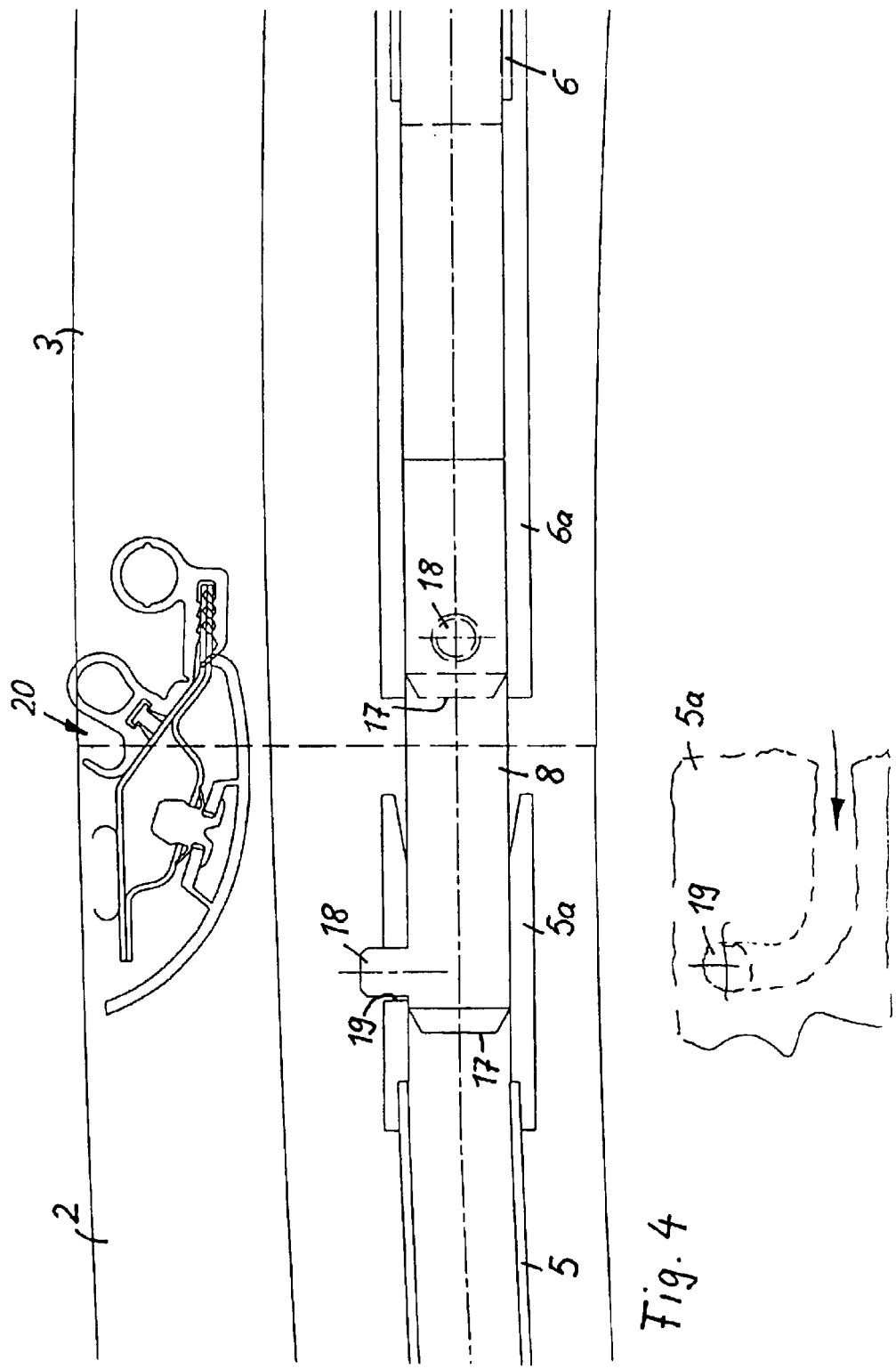

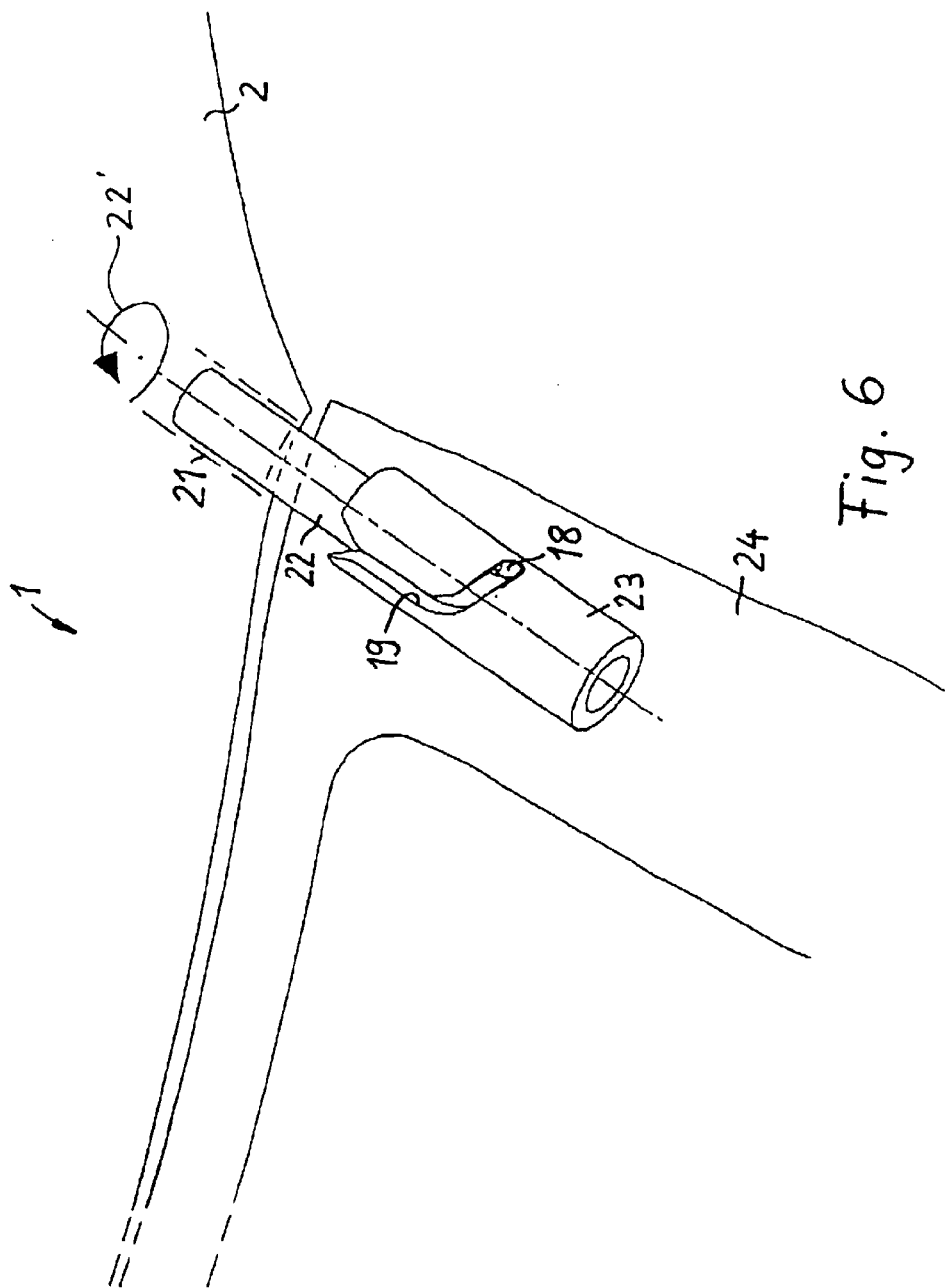

HARDTOP VEHICLE ROOF MOVABLE BETWEEN CLOSED AND OPEN POSITIONS

This is a Continuation-In-Part application of international application PCT/EP02/12265 filed Nov. 4, 2002 and claiming the priority of German application 101 54 730.7 filed Nov. 9, 2001.

BACKGROUND OF THE INVENTION

The invention relates to a hardtop vehicle roof movable between a closed position and an open position. The roof includes a roof part which, in the closed position, forms an outer roof panel which is connected to the adjacent vehicle body part by a locking bolt.

DE 198 05 477 C1 discloses a vehicle roof which comprises a rigid rear and a rigid front roof section which, in their closed positions, are arranged closely adjacent each other so as to form a continuous outer vehicle roof skin. For moving the hardtop roof sections between the closed and the open or storage positions, a roof operating mechanism is provided which connects the rear roof part to the vehicle body and the front roof part to the rear roof part and which makes the transfer movement of the roof parts possible.

Generally, it is a problem for convertible vehicles that, at high vehicle speeds with the roof closed, there occurs a vacuum at the outer skin of the roof parts, which tends to raise the roof parts whereby the water- and air-tightness of the roof is detrimentally affected and, over an extended period, the roof may suffer damages.

FR-A 2 791 007 discloses a two-part vehicle roof including two roof sections which, in the closed position, are disposed closely adjacent one behind the other and which include side sections in which locking rods are movably supported. At the front end of one of the locking rods, there is a receiver structure. At the adjacent vehicle roof structure, there is a locking bolt which, in locking position, engages the receiving structure. The locking bolts with receiving structure and locking bolt form a locking mechanism for locking the roof parts in the closed position.

It is however a disadvantage of this arrangement that, for the locking and unlocking procedure the whole locking rod to which the locking bolt is connected must be moved. For an accurate adjustment movement of the locking rod, guide means must be provided over the full length of the respective roof part by which the locking rod is guided. It is possible that, after extended use, the locking rod does not move precisely in the guide means so that either an increased play will occur whereby a safe engagement of the bolt in the bolt lock receiver is no longer ensured or the locking rod may be canted and adjustment movement of the rod becomes impossible.

It is the object of the present invention to provide a movable vehicle roof, which can be locked in its closed position safely and in a simple manner.

SUMMARY OF THE INVENTION

In a vehicle roof which is movable between a closed position, in which the roof covers an interior vehicle space, and an open position and wherein the roof part includes a locking bolt for engagement with an adjacent vehicle part when the roof is in a closed position, the roof part and the adjacent vehicle part each has a guide tube incorporated therein and the locking bolt is movably supported in one of the adjacent guide tubes and, upon closing of the vehicle roof, is insertable into the adjacent guide tube and lockable thereto so that the guide tubes and the locking bolt form a continuous tube structure with a common axis when the vehicle roof is in the closed position.

In the guide tubes, the locking bolt is supported so as to be movable between a locking position and a release position. In the locking position of the bolt, which corresponds to the closed position of the vehicle roof, the adjacent roof and, respectively, vehicle parts are firmly interlocked so that relative movement between these parts is prevented. Specifically, lifting of the roof part or parts at high vehicle speeds because of the low pressure generated thereby at the outer surface of the roof is safely prevented. As a result, the tightness, particularly the air and pressure tightness and the durability of the roof are substantially improved.

In addition, the guide tubes reinforce the roof parts and, respectively, the vehicle parts and increase the vehicle safety in case of a rollover accident.

The guide tubes are suitably arranged in both side areas of each roof part that is at the left and right sides of the longitudinal vehicle axis. Accordingly, at least two locking bolts are provided in the left and right roof areas, whereby a symmetrical interlocking of the adjacent roof parts and, respectively, a roof part and the adjoining vehicle body part can be realized. The guide tubes may extend within a bent-over fold of the roof sheet metal.

The vehicle roof is preferably a hardtop roof, wherein the roof parts are rigid. In a particularly advantageous embodiment, three rigid roof parts are provided which are interlocked by the guide tubes and the locking bolts that are movably supported in the guide tubes. The locking bolts are expediently supported in the intermediate roof part so that they can be inserted into the respective guide tubes of the front and rear roof parts for interlocking the roof parts. The locking mechanism including the operating unit for operating the locking bolts are the same in the front area of the intermediate roof part and in the rear area of the intermediate roof part. Preferably, a common operating mechanism is provided for the operation of locking bolts arranged in an action line for interlocking the front and rear roof parts with the intermediate roof part. Expediently, the guide tube extends over the full length of the intermediate roof part and locking bolts are disposed at both ends of the guide tube.

The operating mechanism comprises in a first embodiment an actuator, which may be hydraulic or electric. With such an arrangement, no complicated coupling mechanism for the coupling of the movement of the locking bolt and the movement of the vehicle roof is required.

In another embodiment, the locking and release movement of the locking bolt is kinematically coupled with the movement of the roof, particularly by a connection with an operating mechanism between two adjacent roof parts. This embodiment has the advantage that no additional energy-consuming actuator is needed.

Preferably, the locking bolt has an engagement projection which, in the locking position, projects into a corresponding recess or cut-out in one of the guide tubes. For the transfer from the release position to the locking position or vice versa, the locking bolt is subjected to a mixed sliding and rotating movement of the locking bolt out of the guide tube into the guide tube of an adjacent roof part and a rotation into a locking position and the engagement of the locking projection in the respective recess or cutout. The interlocking of adjacent roof parts is consequently achieved in accordance with a bayonet-lock structure. But other locking arrangements with exclusively translatory or exclusively rotational movements of the locking bolt may also be used.

It is advantageous if, in the closed position of the roof, a movable roof part is locked with a vehicle body component, in that a guide tube in the roof part is aligned with a guide tube in the vehicle body part and a locking bolt is moved into a position in which the two guide tubes are interconnected thereby. In the vehicle body part, this is especially on A column of the vehicle, that is a column which extends upwardly from the horizontal bodyline in a vertical plane extending parallel to the longitudinal vehicle axis and which is part of the windshield frame. The locking and release movement of the locking bolt is expediently controlled as a forced kinematic movement depending on the movement of the roof. But the locking bolts can also be operated independently of the roof by independent actuators.

The invention will become more readily apparent from the following description of preferred embodiments thereof on the basis of the accompanying drawings.

BRIEF DESCRIPTION OF THE DRAWINGS

FIG. 1 is a side view of a three-part hardtop vehicle roof in the closed position wherein the intermediate roof part is interlocked with the front roof part and also with the rear roof part, FIG. 2 is a sectional view of the intermediate roof part taken along line II—II of FIG. 1, FIG. 3 shows an actuator effective in opposite directions which is mounted in the intermediate roof part for actuating locking bolts for engagement with the front and rear roof parts, FIG. 4 shows the detail marked in FIG. 1 by IV in an enlarged representation with the front and intermediate roof parts interlocked by a locking bolt, FIG. 5 is a schematic representation of a recess in the end area of a guide tube for receiving an engagement projection of a locking bolt, FIG. 6 is a partial perspective view of a front roof part in closed position in which it is interlocked with an A-pillar of the vehicle.

DESCRIPTION OF A PREFERRED EMBODIMENT

Figure 7:
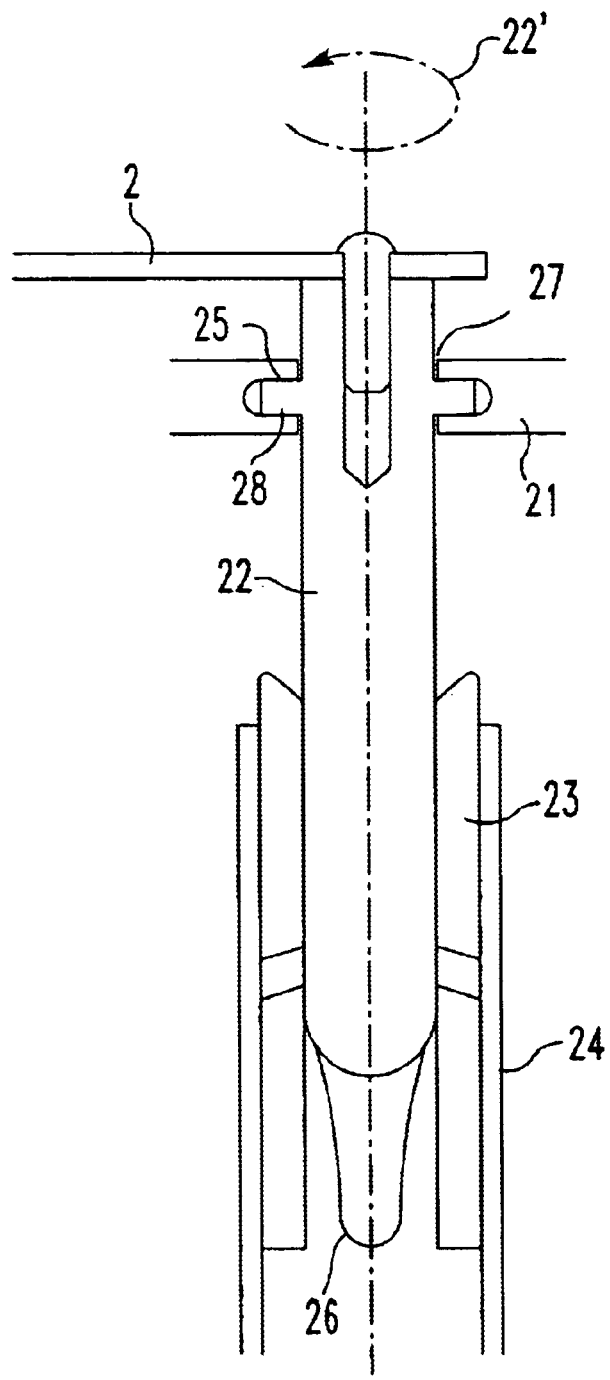
FIG. 7 is a top view showing the locking bolt in a locking position between the vehicle roof and the A-pillar of the vehicle.

In the following description, identical components are indicated by the same reference numerals.

FIG. 1 shows a hardtop vehicle roof 1, which is movable between a closed position as shown in FIG. 1, in which the vehicle interior is covered, and an open or storage position in which the vehicle roof 1 is deposited in a rear storage compartment.

Alternatively, within the context of the invention, a soft-top vehicle roof may be provided.

The vehicle roof 1 comprises three roof parts 2, 3, 4, which are rigid and disposed closely adjacent one another in the longitudinal vehicle direction when the vehicle roof is closed so that they form a continuous outer roof skin. The vehicle roof 1 is transferred between the closed and open positions by means of a roof operating mechanism, which is not shown.

For the interlocking of adjacent roof parts in the closed position of the vehicle roof 1 locking bolts 8 and 9 are movably supported in guide tubes 5, 6, and 7 of the roof parts 2, 3, and 4. The locking bolts 8 and 9 are expediently supported in the guide tube 6 of the intermediate roof part 3. The locking bolt 8 is supported at the front end of the guide tube 6 for engagement with the guide tube 5 of the front roof part 2 and the locking bolt 9 is supported at the rear end of the guide tube 6 for engagement with the guide tube 7 of the rear roof part 4. The locking bolts 8 and 9 are movable between a release position in which the bolts are retracted and not in engagement with the adjacent roof parts. A locking bolt 8 interlocks the front roof part 2 with the intermediate roof part 3 and the rear locking bolt 9 interlocks the rear roof part 4 and the intermediate roof part 3. The three guide tubes 5, 6 and 7 in the different roof parts 2, 3, and 4 are in the closed position of the vehicle roof aligned along a common force line and form a quasi-unitary guide tube with a common guide tube axis. In the closed position of the roof, the locking bolts 8 and 9 are partially inserted into the guide tubes 5 and 7 of the adjacent roof parts 2 and 4.

As shown in the transverse cross-sectional view of FIG. 2, the guide tubes extend in the side areas of the roof parts: Expediently one guide tube is arranged at each side of each roof part. The guide tubes do not only accommodate the locking bolts, but they also reinforce the roof parts and, as a result, increase the stability of the vehicle roof. The guide tubes consist preferably of a lightweight construction material. Expediently, the guide tubes are contained within a fold of the vehicle roof panel, preferably on the inside of a side offset of the vehicle roof panel. Immediately adjacent the guide tube, there is a seal element 10 mounted on a vehicle body panel part 11 by way of which the roof part is sealed to the vehicle body when the vehicle roof is closed.

FIG. 3 shows an operating mechanism for actuating the locking bolts. The operating mechanism comprises an actuator 12 in the form a hydraulic operating cylinder, but it may also be an electric actuator. At its opposite ends, the actuator 12 has operating members 13 and 14, which extend in the direction of the arrows 15 and 16, respectively, for moving the respective locking bolts 8 and 9 from the release positions into the locking positions, see FIG. 1. The actuator 12 is arranged expediently in the intermediate roof part 3, particularly in the guide tube 6 in the center between the opposite locking bolts 8 and 9, which are arranged at the opposite ends of the guide tube 6. The operating members 13 and 14 transmit an actuating movement to the locking bolts 8 and 9 in a pull as well as in a push direction so that, upon operation of the actuator, the locking bolts 8 and 9 are moved between the release and the locking positions thereof.

FIG. 4 shows in an enlarged view a section of the area where the roof parts 2 and 3 are joined. In the section shown, a locking bolt 8, which is guided in an end area 6a of the guide tube 6 of the intermediate roof part 3 so as to be movable from the retracted release position as shown by a dashed lines to the locking position which is shown in full lines. In the locking position, the locking bolt 8 extends into a sleeve-like end section 5a of the guide tube 5 in the front roof part 2. Adjacent its front end 17, the locking bolt 8 has a radial engagement projection 18, which, in the locking position of the locking bolt, projects into an opening 19 in the end section Sa of the guide tube 5. The opening 19 is at the circumference of the end section 5a of the guide tube 5 and includes, beginning at the front end adjacent the intermediate roof part 3, first an axially extending part which then changes, by an angle of 90° to a circumferentially extending part at the end of which the engagement opening is provided into which the projection extends in the locking position of the locking bolt 8. Because of this configuration of the opening 19, the locking structure between the adjacent roof parts is in the form of a bayonet lock, which requires a mixed translatory and rotary movement of the locking bolt for the release and for the locking movement. In the locking position, a form-locking connection is therefore provided between adjacent roof parts. The end sections 5a and 6a of the guide tubes 5 and 6 may be separately formed components, which are connected to the guide tubes.

Adjacent the roof panels of the adjacent roof parts 2 and 3, a seal structure 20 is provided which seals any gaps between the roof parts 2 and 3.

FIG. 6 shows an embodiment of the invention, wherein the front roof part 2 of the vehicle roof 1 can be locked in the closed position of the vehicle roof to the front A-pillar 24 by way of another locking bolt 22, which is arranged at the front end of the front roof part 2. The A-pillar 24 is a windshield frame member, which extends alongside a side edge of the windshield and forms part of the windshield frame to which the front part 2 of the vehicle roof 1 is connected when the roof is closed. The locking bolt 22 is guided in an additional guide tube 21, which is arranged at the front part 2 of the roof. In the A-pillar 24, there is another guide tube 23, which receives the locking bolt 22 when the roof is locked in the closed position. The locking bolt 22 expediently—as indicated by the arrow 22'—is rotatable about its longitudinal axis: it is not axially movable relative to the vehicle roof. For the transfer into the locking position, the locking bolt 22, which projects beyond the front edge of the front roof part 2 is inserted into the opening of the guide tube 23 in the A-pillar 24 when the roof is closed. In the front area, the locking bolt 22 is provided with a projection 18, which during closing of the roof, enters a guide slot 19 in the guide tube 23. The guide slot 19 extends first axially in a first straight section and then circumferentially in a second curved section so as to form a bayonet locking structure for the engagement and locking of the locking bolt 22.

As apparent from the top view of FIG. 7, the guide tube 21 in the front part 2 of the roof is in the form of a guide disc with an opening 27 having a circumferential groove 25. The locking bolt 22 is received in the opening 27 and provided with a flange 28 accommodated in the circumferential groove 25 so that the locking bolt 22 is rotatable but axially fixed. As indicated by a dashed line, the front end of the locking bolt 22 may be provided with a centering pin 26, which facilitates the insertion of the locking bolt 22 into the guide tube 23 in the A-pillar 24 during closing of the vehicle roof when the front roof part 2 approaches the windshield frame.

The guide tube in the A-pillar can be welded into the A-pillar 24, it may be an extruded or cast structure or it may be formed as an integral part of the A-pillar.

What is claimed is:

1. A vehicle roof which is movable between a closed position and an open position, comprising at least two roof parts which, in the closed position of the vehicle roof, form a continuous outer roof surface, at least one of said roof parts including a locking bolt for engagement with an adjacent roof part when the vehicle roof is in a closed position, said roof parts each including a guide tube incorporated in opposite side portions thereof for reinforcement of said roof parts and said locking bolt being movably supported in one of two adjacent guide tubes and, upon closing of said vehicle roof, being insertable into the other of the adjacent guide tubes and being lockable thereto so as to form a continuous reinforcement tube and bolt structure with a common tube axis when the vehicle roof is in the closed position.

2. A vehicle roof according to claim 1, wherein said locking bolt includes a lockup projection, which in said locking position, extends into a corresponding opening in one of the guide tubes interconnected by the locking bolt.

3. A vehicle according to claim 1, wherein an actuator for operating the locking bolt is provided.

4. A vehicle according to claim 1, wherein said locking mechanism is operable by a roof operating mechanism for opening and closing the roof.

5. A vehicle according to claim 1, wherein said roof parts have side areas opposite a longitudinal center axis and a locking bolt is provided at each side area of at least one of said roof parts.

6. A vehicle according to claim 1, wherein said vehicle roof is a hardtop vehicle roof and said roof parts are rigid shells.

7. A vehicle according to claim 5, wherein at least two roof parts are provided which, in the closed position of the roof, are arranged in the longitudinal vehicle direction closely adjacent one another and each of said roof parts includes in each of its opposite side areas a guide tube and the respective guide tubes of adjacent roof parts are interconnected by locking bolts when the vehicle roof is in a closed position.

8. A vehicle according to claim 7, wherein a front, an intermediate and a rear roof part are provided and the front and the rear roof parts are locked by locking bolts to the intermediate roof part when the roof is in a closed position.

9. A vehicle according to claim 8, wherein said locking bolts for interlocking the roof parts are supported in said intermediate roof part and the locking bolt for engaging the front roof part and the locking bolt for engaging the rear roof part, both are operable by a common operating structure.

10. A vehicle according to claim 9, wherein said operating structure is an actuator disposed in the guide tube of said intermediate roof cart between said locking bolts, said actuator having operating members extending from opposite ends of said actuator and being connected to the locking bolts at the opposite ends of said guide tube.

11. A vehicle according to claim 1, wherein the vehicle part to which the front end of the front roof part is connected when the vehicle roof is closed, is an A-pillar of the vehicle which A-pillar is provided with an integral guide tube for receiving a locking bolt mounted to the front end of the guide tube integrated into the front roof part.

* * * * *